Nov. 28, 1950 — H. P. PETERSEN — 2,532,073

DOFFER FOR COTTON PICKER SPINDLES

Filed July 2, 1945

Inventor:
Hans P. Petersen.
By Paul O. Pippel
Atty.

Patented Nov. 28, 1950

2,532,073

UNITED STATES PATENT OFFICE 2,532,073

DOFFER FOR COTTON PICKER SPINDLES

Hans P. Petersen, Chicago, Ill., assignor to International Harvester Company, a corporation of New Jersey Application July 2, 1945, Serial No. 602,717

3 Claims. (Cl. 56—30)

This invention concerns mechanism utilizable for doffing cotton from the spindles of mechanical cotton-picking machines, and relates more particularly to pneumatic mechanism which functions by projecting an air stream over the surface of the spindles.

One type of cotton-picking machine with which the invention is adapted for use employs horizontal vertically-spaced rows of crop-gathering spindles. These rows of spindles are generally circular and coincide with closed paths along which such spindles are bodily advanced. The spindles project radially outwardly of their path formations and are rotated about their individual axes during traversal of said paths. One portion of the paths is within the plant row where the rotating spindles wind the crop thereonto and extract it from the bolls. Spindle doffing mechanism is at a succeeding portion of the paths to remove the picked cotton and thereby clear the spindles before their reentry into the plant row.

Conventional doffing mechanism includes a series of coaxial vertically-spaced rotating disks disposed in meshed relation with the vertically-spaced rows of spindles. These disks have a side arranged closely to but spaced from respective rows of the spindles from which they doff the cotton as the spindles sweep therepast, and such spacing of the doffer disks from their respective rows of spindles is a material factor in the efficiency of doffing. Sometimes, however, field conditions are encountered that modify the desired spacing of the spindles and their doffer disk. An unusually developed crop, for example, may spring a disk and/or a cooperating spindle upon which the crop is wound, or such springing may be incurred by a non-compressible foreign object passing between a disk and any of its cooperative spindles.

The general object of this invention is the provision of a novel doffing apparatus which diminishes the likelihood of significant misadjustment relatively to the spindles. This object is gained partly through the use of apparatus inherently capable of being spaced more distantly from the spindles and partly by the apparatus being more tolerant of variation in its spacing from the spindles.

A more specific object is the provision of doffing apparatus comprising a nozzle adapted to direct a thin sheet-like stream of air onto the surface of the picker spindles, between such surface and the cotton thereon and toward the free ends of the spindles to peel the cotton therefrom.

Another object is the provision of a pneumatic doffing apparatus comprising a doffing nozzle having a narrow slit-like discharge opening and so disposed with respect to picker spindles as they are swept therepast as to project a sheet-like air stream both circumferentially and axially of the spindles for loosening the cotton thereon and sliding the cotton endwise from the free ends of the spindles.

These and other desirable objects inherent and encompassed by the invention will be more fully understood from the ensuing description and the annexed drawings, wherein.

Figure 1:
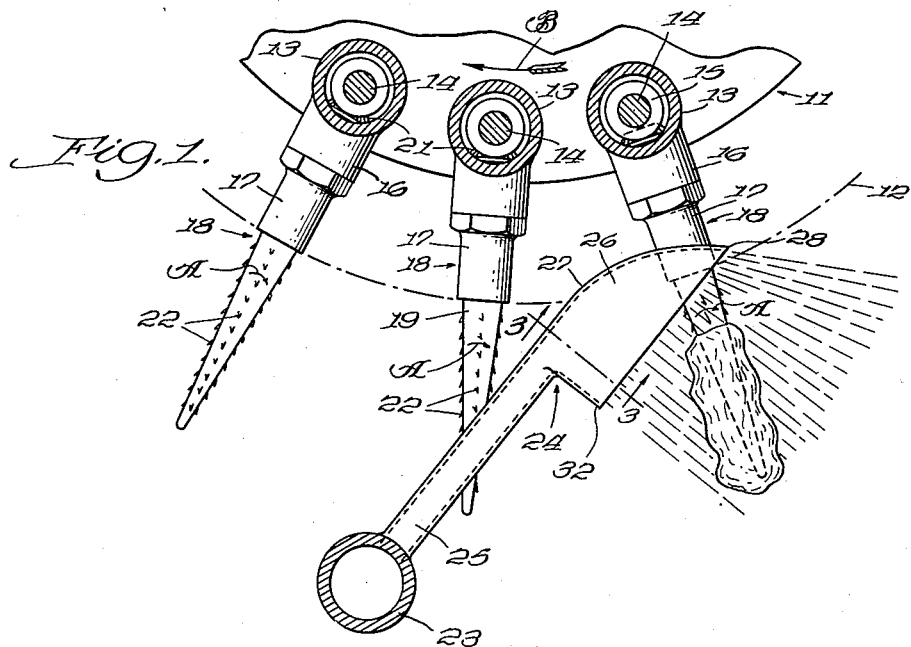
Fig. 1 is a fragmentary horizontal sectional view taken through a picking unit of a spindle-type cotton-picking machine and illustrating a doffing nozzle associated with the spindles of the unit.

A cotton-picking unit of the type of which a fragmentary portion is illustrated in the drawings annexed hereto is shown and described in detail in United States Patent No. 2,140,631 to E. A. Johnston, to which reference may be had if desired. For the present disclosure, it will suffice to explain that the cotton-picking unit here-in illustrated comprises a carrier 11 rotatable about a central vertical axis coinciding with the center about which the dot-dash line 12 in Fig. 1 is generated. Carrier 11 has a plurality of vertical or upright spindle carrying bars 13 spaced radially from such axis and distributed circumferentially thereabout. These bars 13 are hollow and each contains a spindle driving shaft 14 having a plurality of spindle driving gears 15 spaced vertically thereof and constrained for rotation therewith. Adjacently to each of the gears 15 each hollow bar 13 has a hollow spindle receiving boss 16, and each boss 16 has threaded thereinto a bearing portion 17 of a picker spindle assembly 18. Each picker spindle assembly comprises a barb-carrying element 19 journaled in its associated bearing 17 and driven by a beveled gear 21 meshed with an associated gear of the spindle driving gears 15 within the associated bar 13. Since the spindle assemblies 18 are non-supported at their outer tapered ends, such ends may be considered as free ends and the spindle assemblies may be regarded as free ended spindles.

Means not herein shown rotates the spindle driving shafts 14 in the direction for causing the barb-carrying elements 19 to rotate in the direction indicated by the arrows A associated with some of the spindles. Barbs 22 on the spindles are arranged in rows extending generally axially of the spindles, and these barbs project both axially of the spindles and slightly circumferentially thereof in the direction of spindle rotation about the spindle axes. Such disposition of the spindle barbs increases their aggressiveness in picking the crop and facilitates doffing of the crop therefrom in a manner to be explained later.

Figure 2:
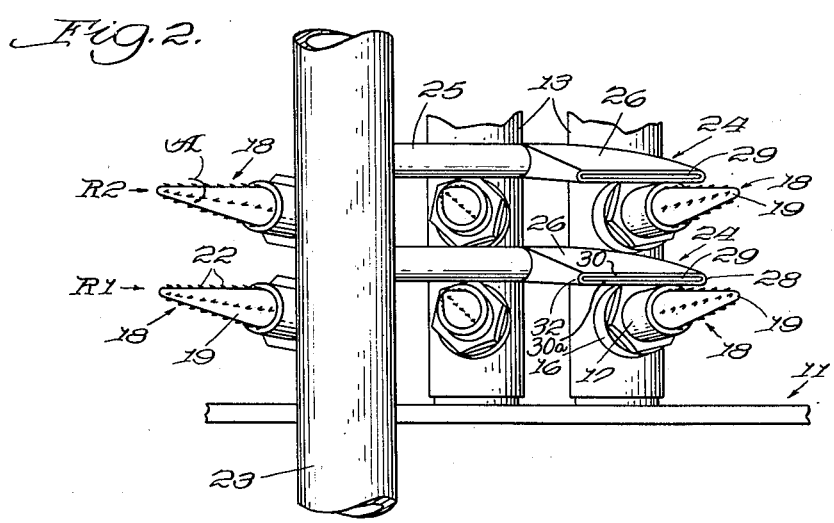
Fig. 2 is a fragmentary side elevational view of the apparatus illustrated in Fig. 1 and looking endwise toward the spindles illustrated in that figure.

While the picking unit is in operation, the spindles, in addition to rotating about their individual axes are revolved about the vertical axis of the carrier in the direction indicated by the arrow B in Fig. 1. Thus the barb bearing portions of the spindles are carried transversely of their individual axes through horizontal paths. In Fig. 2 it can be seen that the spacing of the spindles is uniform for all of the bars 13 so that the spindles are grouped in horizontal rows. There may be any number of these vertically spaced horizontal rows of spindles, depending upon the size of the picking unit, but ordinarily there will be from fourteen to twenty horizontal rows of spindles with each row disposed in substantially a respective horizontal plane. The drawing illustrates only the two lowermost horizontal rows of spindles, the lowermost row being designated R1 and the next higher row R2 in Fig. 2.

The present invention concerns a pneumatic doffing apparatus cooperable with the spindle units 18 for doffing cotton from their barbed portions. In the present embodiment this doffing apparatus comprises a vertical tubular standard 23 suitably supported in fixed relation beside the rotatable spindle carrier 11. A plurality of doffing nozzles 24 are supported in vertically spaced relation upon the standard 23. These nozzles 24 correspond in number to the number of horizontal picker spindle rows as R1 and R2, and are positioned immediately above and adjacently to the row of spindles with which they respectively function.

Figure 3:
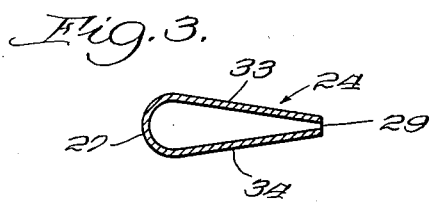
Fig. 3 is a sectional view taken transversely of one of the nozzles as indicated by the line 3—3 in Fig. 1.

Said nozzles 24 each comprise a hollow stem 25 communicative with and projecting horizontally and radially from the tubular standard 23. A flattened hollow head 26 is supported upon the free end of each nozzle stem. The back edges 27 of these nozzle heads have a thickness or vertical dimension corresponding to the diameter of their stems 25 at the point of juncture of said heads and stems. Such back edges 27 of the nozzle heads taper as they curve toward the points 28. Elongated narrow rectilinear slit-like openings 29 having opposite long edges 30 and 30A are formed in the forward edges of the heads or nozzles 26, these openings extending all the way from the tip 28 of their respective heads to an end 32 of their associated forward edge. In Fig. 3 it can be seen that the opposed inner surfaces 33 and 34 of the flat side walls of these heads taper or converge from the back edge 27 toward the slit-like opening 29. Such tapering of the wall surfaces 33 and 34 causes air which is introduced into the heads from the tubular standard 23 and through the stems 25 to issue from the slit-like openings 29 in the form of thin sheet-like streams. Each of these flat or thin nozzles defines a horizontal plane coincident with its slit-like opening and is serviceable when subjected to internal air pressure to project a sheet-like air stream therefrom within a plane substantially coincident with that defined by such nozzle. The pattern and direction of flow in various sections of such a stream is illustrated by the lines leading from the opening 29 of the uppermost nozzle shown in Fig. 1.

In the operation of the doffing apparatus, the spindles in each horizontal row as R1 and R2, while loaded with the cotton from the boll of a cotton bearing plant, succesively approach their associated nozzle head 26. The points 28 of these nozzle heads are disposed radially inwardly of the carrier 11 with respect to the barb-carrying portions of the spindles, so that the air issuing from the nozzle openings adjacently to the points 28 will be radially inwardly with respect to the cotton on the spindles. The nozzle openings 29, as plainly shown in Fig. 1, are arranged diagonally of the spindles as they approach such openings. In other words the vertical standard 23 and the stems 25 constitute means for supporting the flattened nozzle portions 26 flatwise of and contiguous to the respective horizontal planes occupied by the rows of spindles complemental thereto, and, as shown in Fig. 1, the nozzles are supported in such a position that their slit-like discharge openings are disposed in vertical registry with and diagonally of the spindles as they sweep therepast. This enables the nozzles to project their air streams along the surface of the spindles and beneath the cotton on such spindle surfaces and lengthwise of the spindles toward their free ends. By so mounting the nozzles with their openings arranged diagonally in the manner illustrated, the air streams issuing therefrom are directed both tangentially of the spindles in the direction of their rotation about their individual axes and in the circumferential direction in which the points of their barbs protrude as well as axially of the spindles toward their free ends. Thus, there is a force component imparted to the cotton by the air stream circumferentially of the spindles in the direction to loosen the cotton from the barbs, as well as a force component imparted by the air stream to the cotton axially of the spindles for doffing the loosened cotton therefrom. In Fig. 2 it can be seen that the nozzle heads lie in horizontal plane-like zones in contiguous parallelism with the planes of the paths swept through by their respectively associated horizontal row of spindles. By means of this disposition of the nozzles, the thin air streams issuing therefrom are projected along the surface of their spindles and between such surfaces and the cotton thereon which enables these fast flowing air streams to function in a knife-like manner in peeling or stripping the cotton from the spindles. Air issuing from the nozzles adjacently to the points 28 normally first acts effectively upon the cotton of the approaching spindles, and as the spindles continue in their revolving movement about the axis of the carrier 11, air issuing from sections more distant from the points 28 is directed onto the spindle surfaces beneath the partially stripped or peeled cotton until the cotton is finally discharged from the ends of the spindles.

Having thus described a single preferred form of the invention with the view of clearly illustrating the same, I claim:

1. For use in a cotton picking machine having free ended picking spindles which are swept endwise substantially in a horizontal plane; a pneumatic doffing apparatus for doffing cotton from such spindles, said apparatus comprising a thin pneumatic doffing nozzle having a slit-like discharge opening serviceable to project a sheet-like air stream from the nozzle within a plane substantially coincident with that defined by such thin nozzle, and means for supporting said nozzle flatwise of and contiguous to the plane of said spindles and with the slit-like discharge opening disposed in vertical registry with and diagonally of the spindles as they sweep therepast, to project said air stream along the surface of said spindles beneath the cotton thereon and lengthwise of such spindles toward their free ends.

2. For use in a cotton picking machine having conical picking spindles tapering toward free ends thereof and rotatable about their principal axes while being swept through an endless path having a portion wherein the spindles are disposed transversely thereto while traversing the same; a pneumatic doffing apparatus including a pneumatic doffing nozzle having a narrow elongated discharge opening serviceable to project a sheet-like air stream therefrom, and means for supporting said nozzle with said elongated opening contiguously to and diagonally of said path portion for projecting said sheet-like air stream tangentially and endwise of the surface of the spindles toward their free ends and between such surface and the cotton thereon.

3. For use in a cotton picking machine having free ended barbed conical picking spindles tapering toward the free ends thereof and rotated about their individual axes while being swept through an endless path having a portion wherein the spindles are disposed transversely thereof and the spindle barbs are pointed in the circumferential direction of spindle rotation and somewhat endwise toward the free ends of their spindles; a pneumatic doffing apparatus including a pneumatic doffing nozzle having a narrow elongated discharge opening serviceable to project a sheet-like air stream therefrom, and means for supporting said nozzle with its elongated opening contiguously to and diagonally of said path portion and with said opening facing to project said air stream flatwise and tangentially of the surface of the spindles in the circumferential direction of their rotation and endwise of said spindles toward their free ends while they sweep through said path portion.

HANS P. PETERSEN.

REFERENCES CITED

The following references are of record in the file of this patent:

UNITED STATES PATENTS

| Number | Name | Date |
| --- | --- | --- |
| 976,671 | McDonald | Nov. 22, 1910 |
| 1,155,188 | Zalondek | Sept. 28, 1915 |
| 1,229,599 | Fisher | June 12, 1917 |
| 1,775,890 | Cruise | Sept. 16, 1930 |
| 1,845,431 | Martin | Feb. 16, 1932 |